Sept. 2, 1924.

J. KAHLE 1,507,066

FARM GATE

Filed Jan. 27, 1923

J. KAHLE

FARM GATE

Filed Jan. 27, 1923

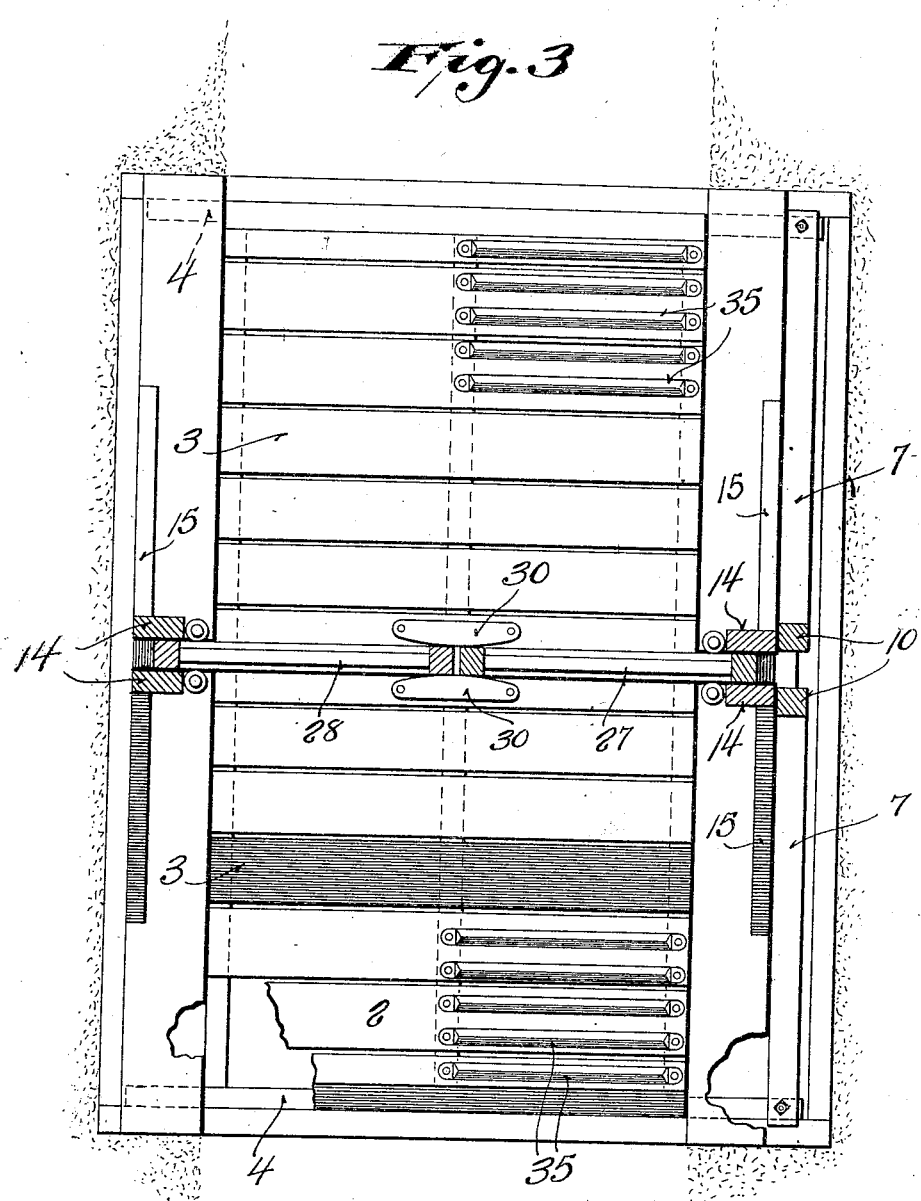

Patented Sept. 2, 1924.

1,507,066

UNITED STATES PATENT OFFICE.

JOSEPH KAHLE, OF TOMAHAWK, WISCONSIN.

FARM GATE.

Application filed January 27, 1923. Serial No. 615,239.

*To all whom it may concern:*

Be it known that I, JOSEPH KAHLE, a citizen of the United States, and resident of Tomahawk, in the county of Lincoln and State of Wisconsin, have invented certain new and useful Improvements in Farm Gates; and I do hereby declare that the following is a full, clear, and exact description thereof.

This invention relates to farm gates and is particularly directed to an automatic gate.

Objects of this invention are to provide a gate which is automatically opened by the weight of a vehicle, and which will automatically close after the vehicle has passed, and which is adapted to be operated by a vehicle coming from either direction.

Further objects are to provide an automatic gate in which the gate portion is formed of two sliding members thereby lightening the several moving parts and facilitating its operation, to provide a double sliding gate which will require a small amount of space, and to provide an automatic gate in which the members are returned to their initial position by the action of gravity, thereby avoiding complicated spring elements in the construction.

Further objects are to provide a gate which, though easily actuated by a vehicle, will be difficultly actuated, if at all, by cattle, which is designed to keep the cattle from the gate structure and which is so designed that an oncoming vehicle will have its speed slightly lessened due to the peculiar construction of platform, thereby lessening the chance of damage to the gate by a rapidly driven vehicle.

An embodiment of the invention is illustrated in the accompanying drawings, in which:—

Figure 3 is a sectional plan view, such section being drawn to an enlarged scale and taken on the line 3—3 of Figure 1.

Figure 1:
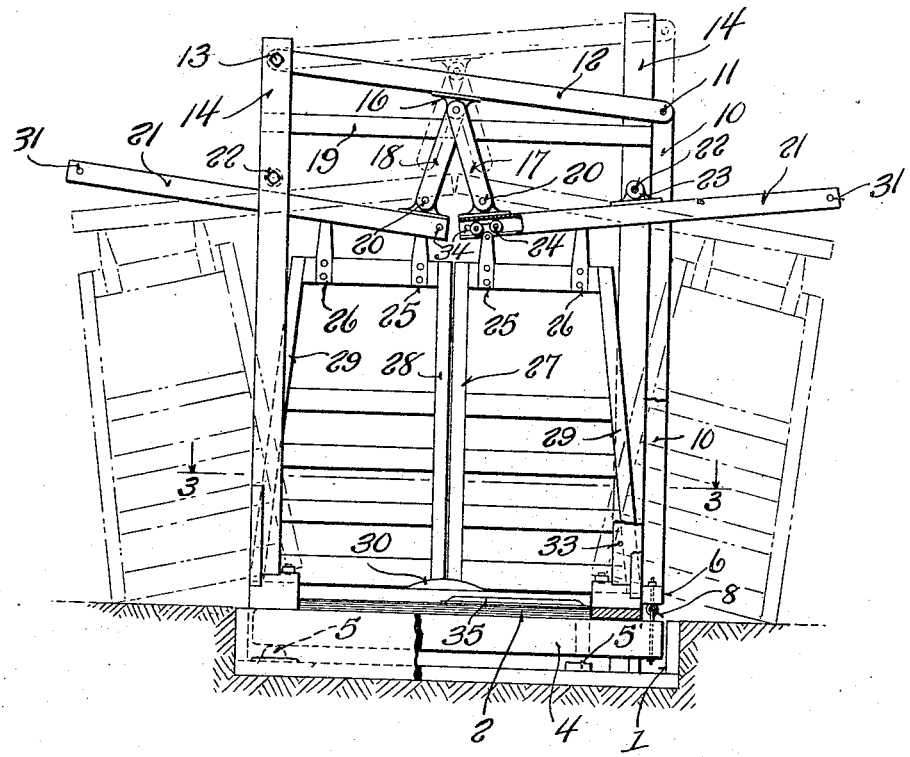
Figure 1 is a front elevation of the gate with certain parts broken away, showing in full lines the closed position thereof and in dotted lines the open position.

Referring more particularly to the drawings, it will be seen that the gate consists of a framework, a portion of which is set down in a relatively small pit 1 in the ground, so as to locate the platform 2 of the gate substantially at the ground line. This platform is provided with a flat portion at its outer ends and with a rise 3 on each side thereof, between its outer ends and its middle. This rise will produce a slight bump in a passing vehicle and will cause the driver to slow up his vehicle in order to negotiate this rise. This slowing up of the vehicle allows ample time for the gates proper to operate so that no damage will come to the gates.

The platform is supported adjacent each end by means of transverse levers 4 which are pivotally mounted as indicated at 5 on one side of the platform. If desired, stops 5' may be provided against which the levers 4 rest when the platform is fully depressed, thereby giving a firm support for such platform. The outer ends of these levers are pivotally joined to the end 6 of longitudinally extending levers 7 by any suitable means, as for example, the eye bolts 8 illustrated in Figures 1 and 2. The levers 7 are positioned upon the same side of the platform and are pivotally supported. Each lever 7 may be provided with a bracket 9' with a plurality of holes aligning with corresponding holes in a fixed bracket 9". A pivot pin 9 is passed thru any of the aligning holes to provide an adjustable pivot point. This results in a multiplying link mechanism, producing relatively extensive movement of the free ends of the levers 7 for a relatively small pivotal action of the platform 2 and consequently of the levers 4. The inner ends of the levers 7 are each pivotally joined to vertical links 10 as may be seen particularly from Figures 1 and 2. These links are, at their upper ends, joined by means of a pin 11 or other suitable member, to the free end of a transversely extending lever 12, whose other end is pivoted, as indicated at 13, to the uprights 14 of the gate. These uprights 14 are similar on both sides of the gate and are suitably braced by members 15 extending diagonally upwardly from the lower framework. The free end of the lever 12 is suitably positioned between the corresponding uprights 14 which serve therefore to guide such lever.

At an intermediate point on the lever 12 a bracket 16 is secured and pivotally carries a pair of diverging links 17 and 18. These links may be duplicated on opposite sides of the bracket 16 so as to span the transverse brace 19 which joins the uprights 14. The lower ends of these links 17 and 18 are pivotally joined, as indicated at 20, to the inner ends of pivotally mounted suspension tracks 21.

These tracks are mounted between the corresponding uprights 14 and are pivotally supported by means of the pin 22 and bracket 23. Any suitable form of track may be used, the form illustrated in the drawings being found satisfactory and consisting of a hollow box-like structure with a slot on its under side. A series of trucks 24 are positioned within the tracks 21 and tongues 25 and 26 extend downwardly from these trucks thru the lower slot in the tracks.

Figure 2:
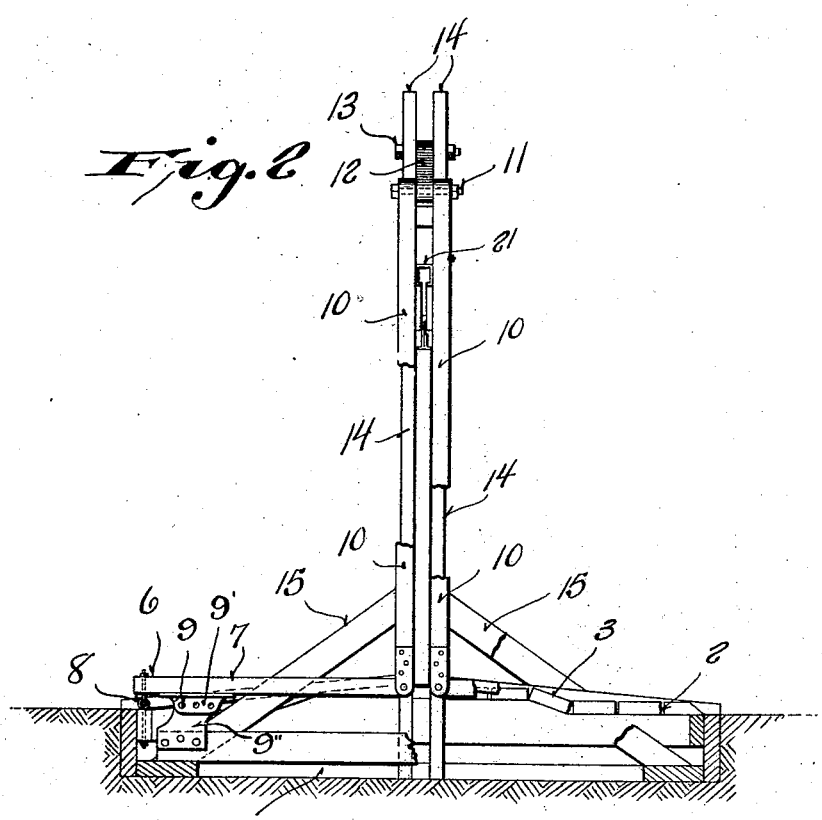
Figure 2 is a side elevation of the structure shown in Figure 1 with certain of the parts broken away to more clearly illustrate the structure.

A pair of sliding gates 27 and 28 are suspended from the straps 25 and 26 so that when in closed position, as indicated in full lines at Figure 1, the upper and lower portions of the gates will be substantially horizontal. This will be readily accomplished by forming straps 25 and 26 of different lengths. The gates are preferably provided with vertical abutting faces as illustrated, and with slanting outer portions as indicated at 29. These slanting outer portions are positioned between the corresponding uprights 14 when the gate is closed, and serve to brace the gate and prevent its being pushed out of its normal position longitudinally of the platform. As a further aid to prevent the swinging of the gates longitudinally, of the platform, stops 30 are secured to the platform upon opposite sides of the gates. These stops may have rounded juxtaposed faces to provide easy entrance therebetween and to facilitate the guiding of the lower inner corners of the gates proper between such stops.

When the tracks 21 are tilted to their dotted line position as shown in Figure 1, in a manner hereinafter described, the gates slide, under the influence of gravity, towards the outer portions of the tracks and occupy the dotted line positions indicated in Figure 1.

Figure 4:
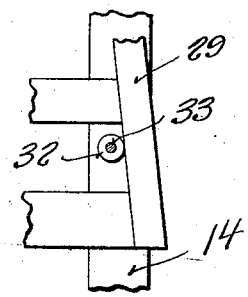
Figure 4 is a detail of a part of the gate.

Pins 31 are passed thru the tracks adjacent their outer ends, to provide stops for the outer movement of the trucks and a roller 32, see Figures 1 and 4, mounted upon a pin 33 extending between the uprights, forms a stop for the lower portions of the gate, as may be seen from the dotted line position in Figure 1. These rollers also act as stops for the gate when such gates are in their innermost position thereby insuring the correct position of the gates. If desired, pins 34 may be provided for the inner ends of the tracks 21 to form stops for the innermost of the tracks.

In gates of this type, it is desirable to prevent their being operated by cattle. This is readily accomplished in applicant's construction by providing a plurality of cleats 35 upon the platform adjacent its outer ends. These cleats extend approximately half way across the platform and are located on the side remote from the pivotal mounting 5 of the levers 4. These cleats are preferably of triangular cross-section, and present relatively sharp upper portions. Cattle will not voluntarily walk across these cleats and consequently will not walk upon the platform in a manner to place their weights in a position effective to open the gate. If they walk upon the left hand side, as illustrated in Figure 3, they will be close to the pivotal point 5 of the levers 4 and their weight will not be sufficient at this disadvantageous leverage position to actuate the gate.

The operation of the apparatus is as follows:—When a vehicle is driven upon the platform, the humped or raised portion 3 will tend to make a careless driver slow down to avoid a bounce, thereby giving the gates time to operate. The weight of the vehicle upon the platform causes it to pivot about the pivotal points 5, thereby depressing the free ends of the levers 4 and consequently rocking the inner ends of the levers 7 upwardly. This motion is communicated by means of the links 10 to the free end of the lever 12, thereby rocking such lever upwardly into its dotted line position as shown in Figure 1. As the lever 12 moves upwardly, the links 17 and 18 lift the inner ends of the tracks 21 upwardly and thus cause the tracks to become inclined downwardly towards their outer ends as illustrated in dotted lines. When the tracks are thus positioned, the gates slide outwardly, the trucks 24 running freely within the tracks 21. When the vehicle has passed thru the gate and off the platform, the weight of the links 10, lever 12 and levers 7 cause the mechanism to move back to its initial position, thus lowering the inner ends of the tracks 21. The gates now slide inwardly to closed position. The rollers 32 serve as stops to limit the inward and outward motion of the gates.

It will thus be seen that an automatic gate has been provided in which the gates proper will move outwardly in a rapid and easy manner upon actuation by the weight of a vehicle, and will as readily move inwardly after the vehicle has passed. It will further be seen that the various portions of the apparatus are restored to their initial positions by the action of gravity, thereby avoiding any spring construction with its liability to become ineffective.

It is to be noted that this construction of gate is extremely simple and is very sturdy in design.

A further feature is the ease with which the gate may be manipulated by an operator when he desires to walk thru such gate. It is merely necessary for him to slide one of the gate members transversely of the platform to provide a passage for himself. Upon release of this gate member, it immediately slides back into its closed position.

Although the term "vehicle" has been used throughout the specification and claims, it has been used primely for the purpose of simplifying the description. It is intended that this term shall apply as well to teams as to vehicles proper, as the gate is adapted to be operated by the weight of teams as well as by the weight of vehicles, as is obvious from a consideration of the disclosure.

If it is found expedient, any suitable portion of the mechanism may be weighted to aid in the return of the gates to their closed position.

Altho one form of the invention has been described in considerable detail, it is to be understood that the invention may take various forms and modifications, and therefore such invention is to be limited only as set forth in the appended claims.

I claim:—

1. An automatic gate comprising a platform, transverse levers supporting said platform and pivoted at one of their ends adjacent one side of said platform with their other ends free and projecting from said platform, a second pair of levers connected with the free ends of said first mentioned levers and receiving rocking motion therefrom, a lever pivotally mounted above and transversely of said platform, links connecting said second mentioned levers and said last mentioned lever, a pair of pivotally mounted tracks operatively connected with said last mentioned lever and adapted to be rocked thereby, and gates slidably suspended from said tracks.

2. An automatic gate comprising a platform pivotally supported adjacent one lateral side and adapted to have its other side depressed, a series of cleats secured to the upper face of said platform upon the side adapted to be depressed, a gate normally positioned transversely of said platform and adapted to obstruct passage thereacross, and mechanism operated by the tilting of said platform to move said gates from obstructing position.

3. An automatic gate comprising a pivotally mounted platform with the pivot points thereof located adjacent a lateral side of such platform, the other side of said platform being adapted to be depressed, a track pivotally mounted above and transversely of said platform, link mechanism connecting said track to said platform, means adapted to travel upon said track, and a gate suspended from said means.

In testimony that I claim the foregoing I have hereunto set my hand at Milwaukee, in the county of Milwaukee and State of Wisconsin.

JOSEPH KAHLE.